UNITED STATES PATENT OFFICE 2,340,045

CONDENSATION PRODUCT AND PROCESS OF MAKING THE SAME

Gaetano F. D'Alelio, Pittsfield, Mass., assignor to General Electric Company, a corporation of New York No Drawing. Application August 30, 1941,
Serial No. 409,021

12 Claims. (Cl. 260—42)

This invention relates to condensation products derived from novel starting materials containing amino, amide,, and imino linkages. More particularly, it is concerned with nitrogen containing resinous compositions comprising aldehyde condensation products of substituted or unsubstituted dicarbamido derivatives of substituted or unsubstituted dimethyl amines represented by the general formula:

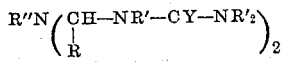

wherein Y represents oxygen or sulphur, R represents hydrogen or a monovalent aliphatic, carbocyclic or aromatic hydrocarbon radical of not more than six carbon atoms, at least one R' represents hydrogen and the other (R')s and the R'' represent either hydrogen or any monovalent hydrocarbon or halo-hydrocarbon radical, whether saturated or unsaturated, aliphatic, alicyclic, aromatic or heterocyclic, mono- or poly-nuclear, etc.

The class of organic compounds under consideration broadly designated as dicarbamido derivatives of an amino dimethyl amine (either substituted or unsubstituted) have been found to react with aldehydes or aldehyde-engendering agents to form resins varying from clear liquid products to vitreous or semi-vitreous solid products. These compounds have further been found to function as catalytic reactants in the preparation of those resins depending on condensation reactions for their formation and as curing reactants for resins obtained for their formation and as curing reactants for resins obtained by condensation reactions.

These novel preformed substituted amine compounds, reactable with aldehydes or agents engendering aldehydes, may suitably be prepared by reacting, in the cold, a concentrated aqueous solution of 1 mol of ammonia or a primary amine with a concentrated aqueous solution of 2 mols of a suitable class of preformed compounds hereinafter referred to as monocarbinol-ureas, which term is intended to cover not only the simple monocarbinol derivatives of urea, such as monomethylol urea, but also the mono-(N-carbinol) derivatives or substituted monocarbinol derivatives of urea and thiourea, or substituted ureas and thioureas, represented by the formula:

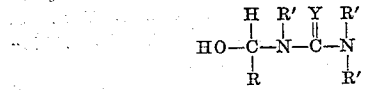

wherein, as previously indicated, Y represents oxygen or sulphur, R represents hydrogen or a monovalent aliphatic, carbocyclic or aromatic hydrocarbon radical of not more than 6 carbon atoms, and at least one R' represents hydrogen and the other (R')s either hydrogen or any monovalent hydrocarbon radical, examples of which are aliphatic (e. g. methyl, ethyl, propyl, isopropyl, butyl, secondary butyl, isobutyl, butenyl, amyl, isoamyl, hexyl, allyl, etc.) including cycloaliphatic (e. g. cyclopentyl, cyclopentenyl, cyclohexyl, cyclohexenyl, cycloheptyl, etc.); aryl (e. g. phenyl, diphenyl, naphthyl, etc.); alkaryl (e. g. tolyl, xylyl, ethylphenyl, propylphenyl, isopropylphenyl, etc.); aralkyl (e. g. benzyl, phenylethyl, phenylpropyl, etc.); and their homologues, as well as those groups with one or more of their hydrogen atoms substituted by a halogen. Specific examples of halogeno-substituted hydrocarbon radicals are chlormethyl, chlorcyclohexyl, chlorphenyl, dichlorphenyl, ethyl chlorphenyl, phenyl chlorethyl, bromethyl, bromtolyl, etc.

Examples of such monocarbinol-urea compounds other than the previously-mentioned monomethylol urea are: monoethylol urea, monomethylol thiourea, monoethylol thiourea, monopropylol urea, monobutylol urea, monobutylol thiourea, monophenylcarbinol-urea (monobenzylol urea), monomethylol phenyl urea, monomethylol allyl urea, monomethylol phenyl thiourea, monomethylol diphenylurea, monomethylol ethyl phenyl urea, etc.

Examples of primary aliphatic, aromatic, alicyclic, etc. amines for the preparation of the diureide derivatives are methyl amine, ethyl amine, propyl amine, isopropyl amine, cyclopentyl amine, cyclohexylmethyl amine, cyclohexyl amine, aniline, toluidine, naphthyl amine, benzyl amine, phenylethyl amine, etc.

Preferably the novel compounds are prepared by slowly adding a cold concentrated aqueous solution of ammonia or a primary amine, i. e. a compound of the formula R''NH$_2$ wherein R'' is H or any monovalent hydrocarbon radical, to the required amount of the cold concentrated aqueous solution of the desired monocarbinolurea in the ratio of 1 mol ammonia or amine to 2 mols of the monocarbinol urea at a temperature between 0 and —20° centigrade. The mixture is held within this temperature range for the duration of the condensation reaction in which the ammonia or the designated amine reacts with the monocarbinol-urea to form the dicarbamido derivative as follows:

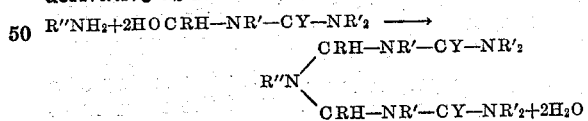

Thus 1 mol ammonia (R''=H) reacts with 2 mols monomethylol urea to form the simplest di-(carbamidomethyl) amine having the formula $$HN(CH_2NHCONH_2)_2$$

The product of this reaction is recovered by evaporation of the water from the reaction mixture at room temperature or at temperatures below room temperature, either at atmospheric or subatmospheric pressures.

Alternatively, the crystalline products may be recovered by adding to the aqueous solution of the reaction product a suitable water-miscible precipitant therefor, which precipitant is incapable of reacting with the desired crystalline product.

I have discovered that the class of compounds represented by the formula

is a very versatile class of organic compounds.

The compound $R''N(CH_2NHCYNH_2)_2$ is more readily resinified by aldehydes than are the other compounds of the general formula

and the approximate ease of resinification decreases progressively as the hydrogens are replaced by monovalent hydrocarbon radicals.

The novel compounds of this invention may be used as reactant catalysts in the preparation of synthetic resins, especially aminoplast resins, from aldehydes and other aldehyde reactable organic compounds, e. g. in the condensation of urea-formaldehyde, thiourea-formaldehyde, melamine-aldehyde, protein aldehyde, phenol-aldehyde, etc. By a reactant catalyst is meant a substance that will accelerate the condensation between an aldehyde and an aldehyde-reactable organic compound while it itself becomes part of the resin. In this connection, the related compounds having no active hydrogens, i. e. having the formula $R''N(CR_2NR'CYNR'_2)_2$, wherein R, R', and R'' are monovalent hydrocarbon radicals, cannot participate in aldehyde condensation processes, but are, however, valuable as plasticizers or as direct condensation catalysts, as distinguished from reactant catalysts, in the preparation of other resins, especially aminoplasts.

Being bases, the novel compounds of this invention and the related completely substituted compound mentioned above form salts with organic and inorganic acids such as hydrochloric, sulfuric, nitric, hydrofluoric, carbonic, formic, acetic, propionic, butyric, chloracetic, dichloracetic, benzoic, phthalic, cyclohexyl, carboxylic, oxalic, malonic, succinic, adipic, maleic, fumaric, citraconic, acrylic, methacrylic, atropic, polyacrylic, polymethacrylic acids, etc. These acids will form salts with the novel class of compounds of this invention before, during, or after reaction with aldehydes, alone or co-reacted with other modifying bodies, as will be hereinafter shown. These salts are valuable in accelerating the conversion of the resins obtained from the base compound $R''N(CRHNR'CYNR'_2)_2$ and aldehydes to the insoluble and infusible state. They likewise function in accelerating the conversion of other aminoplast resins such as urea-aldehyde resins, melamine-aldehyde resins, protein-aldehyde resins, etc., or as curing reactants therefor. A curing reactant is defined as a substance which causes the curing or accelerates the curing of a resin while it itself is a part of the resin or at some time becomes an integral part of the resin. Since these salts become part of the resin, the final resin strictly may be called an aminoplast resin.

The novel class of organic compounds of this invention may be mixed with resin intermediates containing carbinol ($—CR_2OH$) groups, such as monomethylol ureas, dimethylol ureas, phenol methylols, protein methylols, the methylols of cyclic amidines, e. g., melimine methylols, aminopyrimidine methylols, guanazole methylols, etc., and then co- or inter-resinified alone or in the presence of active methylene compounds or other modifying bodies.

Before, during, or after the resinification process, the reaction between the aldehyde or a mixture of aldehydes and the novel compounds of this invention may be modified by the presence of suitable amounts of a large class of compounds, for example hydroxy compounds, e. g. methyl, ethyl, propyl, isopropyl, butyl, amyl, tertiary amyl, benzyl, furfuryl, tetrahydrofurfuryl, cyclohexyl, phenethyl, naphthyl, polyvinyl, allyl, methallyl, crotyl, 1-chlorallyl, propargyl, 2-chlorallyl, cinnamyl alcohols, etc. glycol, diethylene glycol, triethylene glycol, polyethylene oxide, glycerine, pentaerythritol, saligenin, alkyd resin, phenol, cresol, xylenol, resorcinol, catechol, pyrogallol, naphthol, etc.; chlorohydrin, epi-chlorohydrin, nitrobutanol, diacetone alcohol, ethylene oxide, propylene oxide, etc.; ammonia and its amino, amido, or imino compounds, e. g. methylamine, dimethylamine, hydroxylamine, hydrazine, phenyl hydrazine, diamylamine, stearyl amine, cyclohexyl amine, aniline, di-phenylamine, diaminobenzene, triaminobenzene, aminophenol, nitroaniline, piperazine, ethanolamine, di-isopropanolamine, triethanolamine, propanolamine, ethylene diamine, formamide, acetamide, propionamide, lauramide, acrylic amide, methacrylic amide, atropic amide, malonic diamide, itaconic diamide, succinic diamide, citraconic triamide, benzamide, phthalic diamide, phthalimide, benzoyl sulfinimide, benzoyl sulfonylimide, aminobenzene sulfonylamide, benzene disulfonylamide, benzene trisulfonylamide, anthranilic esters, anthranilamide salicylamide, para phenyl benzene sulfonylamide, tolyl amide, etc.; the amino 1,3,5 triazenes, e. g. 2,4,6 triamino 1,3,5-triazene, 2-amino-1,3,5-triazene, 2,4-diamino-1,3,5-triazene; the hexadiazenes, e. g. 2,4,6 triaminopyrimidine, the diamino pyrimidine thio ethers; the amino-1,2,4-triazoles, e. g. guanazole, phenyl guanazole, dehydrazamido-1,2,4 pyrrodiazole, guanazo-guanazole, imidurazo-guanazole, the amino 1,2 diazoles, e. g. 3,5 diaminopyrazole, the urea type compounds, e. g. urea, methylurea, monomethylol urea, phenyl urea, thiourea, phenyl thiourea, unsymmetrical diphenyl urea, unsymmetrical ethyl phenyl urea, hydroxy urea, ethanol urea, unsymmetrical diethanol urea, guanidine, aminoguanidine, biguanidine, di-cyandiamide, guanyl urea, guanyl thiourea, the proteins, e. g. casein, soya bean protein, alfalfa protein, gelatin, coffee bean protein, alkyd resins having free hydroxyl groups such as glyceryl phthalate, oil-modified glyceryl phthalate, diethylene glycol succinate, triethylene glycol maleate, glyceryl maleate, etc., nitriles, e. g., acetonitrile, propionitrile, butyronitrile, benzonitrile, acrylonitrile, methacrylonitrile, atropic nitrile, ethylene cyanohydrin, acetone cyanohydrin, aminoisobutyronitrile, aminoacetonitrile, etc., esters, such as lactic esters, hydroxy isobutyric esters, acetoacetic esters, malonic esters, etc.

The highly substituted novel compounds of this invention may be used as plasticizers for many resins, especially aminoplast resins. In many cases they themselves become resinous during the plasticizing process, while in other cases they condense with the resinous intermediate during manufacturing operations. Specifically, these materials may be used (1) unconverted as plasticizers, (2) partly or completely converted as plasticizers, (3) partly or completely intercondensed to exert a plasticizing effect.

The final and intermediate resins and condensation products prepared from the novel materials of this invention alone or with the modification already expressed are extremely compatible with many other natural or synthetic resins in their intermediate or ultimate stages.

This novel class of compounds, when reacted with aldehydes, alone or with modifications, will form self-curing aminoplasts by condensation with curing reactants, such as chloracetonitrile, nitrourea, glycine, amino propanol hydrochloride, mono-, di- or tri-chloracetamides, alpha beta dibrompropionitrile, aminoacetamide hydrochloride, ethylene diamine monohydrochloride, sulfamic acid, chloracetyl urea, citric diamide, phenacyl chloride and others mentioned, for example, in my copending applications Serial No. 346,962, filed July 23, 1940, and Serial No. 354,395, filed August 27, 1940, both of which applications are assigned to the same assignee as the present invention.

The novel base materials of this invention may be used to peptize or swell proteins, shellac, acidic alkyd resins, etc., bringing them into solutions or dispersions or emulsions, or gels. Such compositions then may be "hardened" by the addition of aldehydes, preferably formaldehyde or compounds engendering formaldehyde, such as paraformaldehyde or hexamethylene tetramine.

The initial reaction leading to the formation of the new condensation products of ingredients comprising an aldehyde and a compound of the formula

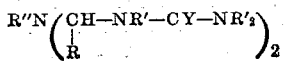

may be carried out at normal or at elevated temperatures, at atmospheric or superatmospheric pressures, and in the presence or absence of an acid or an alkaline condensing agent or catalyst. Preferably the reaction between the components is started under alkaline conditions.

Any substance yielding an alkaline aqueous solution may be used in obtaining alkaline conditions for the initial condensation reaction. For example, I may use an alkali such as sodium, potassium and calcium hydroxides, sodium and potassium carbonates, mono-, di- and triamines, etc. Best results are obtained by causing the condensation reaction between the primary components to take place in the presence of a primary condensation catalyst and a secondary condensation catalyst. To obtain condensation products having optimum time- or storage-stability characteristics, I have found that the primary catalyst should be a member of the class consisting of (1) nitrogen-containing basic tertiary compounds that are aldehyde-non-reactable, e. g. tertiary amines such as trialkyl (for example, trimethyl, triethyl, etc.) amines, triaryl (for example, triphenyl, etc.) amines, etc., and (2) nitrogen-containing basic compounds that are aldehyde-reactable, for instance ammonia, primary amines, (e. g. ethyl amine, propyl amine, etc.) and secondary amines (e. g. dipropyl amine, dibutyl amine, etc.). The secondary condensation catalyst, which ordinarily is used in an amount less than the amount of primary catalyst, should be a fixed alkali, for instance a carbonate, cyanide or hydroxide of an alkali metal (e. g. sodium, potassium, lithium, etc.).

Various ways may be employed for effecting initial reaction between the components. For example, I may first mix all the reactants and effect condensation between the mixed reactants in the presence or absence of addition agents, for instance condensation catalysts, fillers, other natural or synthetic resinous bodies, solvents, diluents, etc. Alternatively I may first condense either my diureide derivative or some other aldehyde reactable material such as a urea, a phenol, a melamine or the like with a suitable aldehyde and thereafter, at any stage of the original reaction, I may add the remaining aldehyde-reactable ingredient or ingredients. Or, I may condense or partially condense the diureide derivative with an aldehyde, add the resulting product to a urea-aldehyde, a phenol-aldehyde, or some other partial condensation product of an aldehyde and an aldehyde reactable body and then cause the reaction to proceed further. Still other ways may be employed in combining the components in producing the modified or unmodified products of this invention, as will readily be understood by those skilled in the art from the following examples illustrating how the principles of this invention are carried into effect.

Example 1

An aqueous solution of the compound

prepared in the manner set forth hereinbefore, was treated with various amounts of N/3 hydrochloric acid to produce solutions of

alone or in acid solution and mixtures of

and

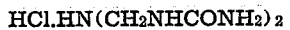

The evaporation of the water from these mixtures produced clear, colorless salts. These salts or solutions thereof are useful as reacting catalysts or curing reactants in the preparation of resinous condensation products, as will be shown more fully hereinafter. When treated with proportionate quantities of an aldehyde, preferably formaldehyde, on a hot plate at 140° C. these salts yielded self-curing resins.

Example 2

The white crystalline product

was treated with aqueous formaldehyde on the hot plate at 140° C. and gave a clear colorless resin that bodied to the thermoplastic stage. The addition of curing reactants, e. g. chloracetamide, glycine, etc., or acids, e. g. citric, sulfamic, etc., to the thermoplastic mass caused hard infusible resins to be produced.

Example 3

| | Parts by weight |
|---|---|
| Aqueous $HN(CH_2NHCONH_2)_2$ (50% concentration) | 12.9 |
| Aqueous formaldehyde (approx. 37.1% concentration) | 9.7 |

The above components were mixed and heated under reflux at the boiling temperatures of the mass for 15 minutes, yielding a clear, colorless, resinous syrup having a pH of 8.47. When tested with about 0.5 per cent of various agents, i. e. chloracetamide, glycine, citric acid, on a hot plate at 140° C. hard, infusible, resins were obtained.

Twenty-three parts of the above syrup were mixed with 0.1 part chloracetamide and refluxed for 10 minutes. Then 7 parts alpha flock and 0.04 part zinc stearate were added and the compound dried at 70° C. to produce a molding compound that formed a well-cured piece when molded at 130° C. and 2,000 #/sq. in. for 5 minutes.

*Example 4*

| | Parts by weight |
|---|---|
| Aqueous $HN(CH_2NHCONH_2)_2$ (50% concentration) | 12.9 |
| Furfural | 11.5 |
| NaOH in 0.5 part water | 0.01 |

These ingredients were heated together under reflux for 15 minutes to yield a syrup of low viscosity. On the hot plate at 140° C. this syrup bodied slowly to a thermoplastic resin. The addition of acids or curing reactants produced self-curing resins of commendable toughness.

*Example 5*

| | Parts by weight |
|---|---|
| Aqueous $HN(CH_2NHCONH_2)_2$ (50% concentration) | 12.9 |
| Acrolein | 6.7 |
| NaOH in 0.5 part water | 0.01 |

The reactants were mixed with the sodium hydroxide and the mixture refluxed for 15 minutes to produce a syrup having a pH of 8.3. Treatment of a sample thereof with suitable agents such as those mentioned in Example 3 on the hot plate at 140° C. produced a heat-hardenable tough resin.

*Example 6*

| | Parts by weight |
|---|---|
| Aqueous $HN(CH_2NHCONH_2)_2$ (50% concentration) | 16.2 |
| Urea | 6.0 |
| Aqueous formaldehyde (approx. 37.1% $CH_2O$) | 20.0 |

The above ingredients refluxed together for 30 minutes to yield a clear resinous syrup, a sample of which, when treated on the hot plate at 140° C. bodied to a clear thermoplastic resin. Conversion to a thermosetting resin was accomplished by the inclusion of any one of a number of suitable curing agents.

Twenty-three parts of the above syrup were converted into a molding compound by mixing 0.1 part chloracetamide therewith, and refluxing the mixture for 10 minutes to permit intercondensation before adding 7 parts alpha flock and 0.04 part zinc stearate. The compound was dried at 70° C. and molded at 130° C. to produce a molded piece with a good cure and gloss.

*Example 7*

| | Parts by weight |
|---|---|
| Aqueous $HN(CH_2NHCONH_2)_2$ (50%) | 16.2 |
| Thiourea | 7.6 |
| Aqueous formaldehyde (approx. 37.1% $CH_2O$) | 20.0 |

The reactants were mixed and refluxed together for 30 minutes. By the addition of less than 1% of certain agents, e. g. chloracetamide, glycine, citric acid, etc. to the reaction mass a heat-convertible resin capable of curing rapidly at 140° C. was obtained.

The intercondensation of 23 parts of this syrup with 0.1 part chloracetamide at reflux temperatures for a few minutes followed by the addition of 7 parts alpha flock and 0.04 part zinc stearate, gave a product which, after being dried at 70° C., could be readily molded at 130° C. The compound exhibited good cure characteristics and the molded piece, good gloss and very good water resistance.

*Example 8*

| | Parts by weight |
|---|---|
| Aqueous $HN(CH_2NHCONH_2)_2$ (50% concentration) | 2.4 |
| Para toluene sulfonamide | 8.6 |
| Aqueous formaldehyde (approx. 37.1% $CH_2O$) | 10.0 |

When heated together under reflux for 15 minutes, these reactants produced a resin that was readily converted to an infusible state by treatment on the hot plate at 140° C. with acids or curing reactants. The cured resin was clear and colorless and, when dissolved in suitable solvents and used as a varnish, a transparent tough film was obtained. The resin was soluble in Solvatone.

*Example 9*

| | Parts by weight |
|---|---|
| Aqueous $HN(CH_2NHCONH_2)_2$ (50% concentration) | 2.2 |
| Aqueous formaldehyde (approx. 37.1% $CH_2O$) | 12.0 |
| Melamine | 6.3 |

The three materials were mixed and refluxed for 15 minutes to yield a clear syrup a sample of which cured slowly to a hard resin when tested on the hot plate at 140° C. The addition of acids and curing reactants greatly accelerated the cure.

A molding compound was prepared as follows: To the above syrup was added 0.1 part chloracetamide and a mixture heated under reflux for 5 minutes. Six parts alpha flock and 0.04 part zinc stearate were added and the compound dried at 70° C. When molded at 130° C. a very well cured piece of pleasing color was obtained.

*Example 10*

| | Parts by weight |
|---|---|
| Aqueous $HN(CH_2NHCONH_2)_2$ (50% concentration) | 5.7 |
| Aqueous formaldehyde (approx. 37.1% $CH_2O$) | 19.5 |
| Phenol (synthetic) | 9.0 |

A mixture of these reactants was heated under reflux for 50 minutes. The resulting resinous syrup was acidified with 0.5 part oxalic acid in 5 parts water and 11 parts alpha flock and 0.1 part zinc stearate were then added. The wet molding compound was dried at 70° C. to produce a compound which molded with good cure at 130° C. to produce a light-colored molded piece.

*Example 11*

| | Parts by weight |
|---|---|
| Aqueous $HN(CH_2NHCONH_2)_2$ (50% concentration) | 4.6 |
| Dimethylol urea (11% $H_2O$) | 25.8 | were mixed with 20 parts water and heated under reflux for 30 minutes. The resulting clear syrup yielded a self-curing resin when treated on the hot plate at 140° C. with various acids and curing reactants.

A portion of the above syrup was used to prepare a molding compound by heating 23 parts by weight thereof with 0.1 part by weight of chloracetamide under reflux for 10 minutes. Seven parts alpha flock and 0.04 part zinc stearate were added and the compound dried at 70° C. Molding of the dried compound at 130° C. produced a well-cured piece.

Example 12

| | Parts by weight |
|---|---|
| Aqueous $HN(CH_2NHCONH_2)_2$ (50% concentration) | 6.4 |
| Aqueous formaldehyde (approx. 37.1% $CH_2O$) | 4.8 |
| Butyl alcohol | 7.4 |

The three ingredients were mixed and heated under reflux for 1 hour. At the end of this time, there was obtained a water-white syrup that bodied on the hot plate at 140° C. to a transparent thermoplastic resin. The addition of acids or curing reactants served to convert the resin to a tough, infusible state. The resin was used as a varnish that oven-baked at reasonably low temperatures with the formation of hard transparent films.

Example 13

| | Parts by weight |
|---|---|
| Aqueous $HN(CH_2NHCONH_2)_2$ (50% concentration) | 6.4 |
| Aqueous formaldehyde (approx. 37.1% $CH_2O$) | 6.4 |
| Diethyl malonate | 1.6 |

During heating together under reflux for 1 hour, the materials reacted to clear colorless syrup. When this syrup was treated with acids or curing reactants on the hot plate at 140° C. a tough infusible resin was obtained. The syrup may be concentrated by the evaporation of the water present therein to yield a very viscous alcohol-soluble resin.

Example 14

| | Parts by weight |
|---|---|
| Aqueous $HN(CH_2NHCONH_2)_2$ (50% concentration) | 9.6 |
| Aqueous formaldehyde (approx. 37.1% $CH_2O$) | 7.2 |
| Acetamide | 0.9 | were mixed and heated under reflux for 1 hour. The clear syrup produced a cured resin when treated with acids or curing reactants and the water evaporated at 140° C.

Example 15

| | Parts by weight |
|---|---|
| Aqueous $HN(CH_2NHCONH_2)_2$ (50% concentration) | 9.66 |
| Aqueous formaldehyde (approx. 37.1% $CH_2O$) | 7.20 |
| Glycerine | 2.9 |

These materials were mixed and heated under reflux for 30 minutes. The clear syrup bodied slowly to a thermoplastic resin when tested on the hot plate at 140° C. The inclusion of acids or curing reactants produced a tough hard resin that may be used as a plasticizer for other aminoplasts.

Example 16

| | Parts by weight |
|---|---|
| Aqueous $HN(CH_2NHCONH_2)_2$ (50% concentration) | 6.4 |
| Aqueous formaldehyde (approx. 37.1% $CH_2O$) | 4.8 |
| Polyvinyl alcohol | 5.8 |

The reactants were mixed with 50 parts water and heated under reflux for 30 minutes. A very viscous clear syrup with a pH of 6.62 was produced which, when treated on the hot plate at 140° C., formed a clear colorless thermoplast. By lowering the pH of the syrup by the addition of acids, the syrup could be converted to a hard infusible state. Films thereof that were baked at 55°–60° C. for 15 hours were rather hard, tough and pliable.

Example 17

| | Parts by weight |
|---|---|
| Alkyd resin (glyceryl phthalate) | 50.0 |
| $HN(CH_2NHCONH_2)_2$ | 2.0 |
| Paraform | 3.0 | were dry mixed and then fused together at 140° C. The resin was converted to a hard, infusible, transparent mass. Such resins are tough and may be used as mica binding, etc.

Example 18

| | Parts by weight |
|---|---|
| Shellac | 50.0 |
| $HN(CH_2NHCONH_2)_2$ | 2.0 |
| Paraform | 3.0 | were dry mixed and heated at a temperature of 140° C. as above. The shellac became a self-curing resin in that a tough infusible product was obtained. As this is a good water-repellent adhesive, it also may be used for binding mica, etc.

Example 19

A phenol-aldehyde varnish was compounded as follows:

| | Parts by weight |
|---|---|
| Phenol—82% (12% orthocresol) | 180 |
| Aqueous formaldehyde (approx. 37.1% $CH_2O$) | 216 |
| $Na_2CO_3$ in 4.15 parts water | 1.8 | were mixed and heated under reflux for 30 minutes to produce a resin syrup having a pH of 8.3 and a hot plate cure at 150° C. of 85 seconds. The solids content of this varnish syrup was 53%. A second syrup was prepared as follows:

| | Parts by weight |
|---|---|
| Aqueous $HN(CH_2NHCONH_2)_2$ (50% concentration) | 128.8 |
| Aqueous formaldehyde (approx. 37.1% $CH_2O$) | 97.2 | were mixed and refluxed for 15 minutes to produce a syrup having a solids content of 45%. When this latter syrup was mixed with phenol-aldehyde varnish in such proportions that the ratio of components on a "solids" basis was 1:9, a product was obtained which when tested for cure on the hot plate at 150° C. was found to have a curing time of 10 to 20 seconds less than that of Varnish A. In other words, the syrup acts as a curing accelerator for the phenol-aldehyde varnish.

On the other hand, when the syrup of this example was mixed with the phenol-aldehyde varnish in such proportions that the solids ratio was 9:1, the resultant product cured at 140° C. to a hard infusible light-colored resin.

Example 20

Example 19 was repeated using, instead of the phenol-aldehyde varnish, a substantially anhydrous liquid phenol-aldehyde resin freed from catalyzing bases and salts. The results were the same as those obtained in Example 19, namely the curing time at 160° C. of the catalyst-free resin varnish was lowered by the presence of the $HN(CH_2NHCONH_2)_2$—$CH_2O$ reaction product compound and the catalyst-free phenol-aldehyde resin served as a curing agent for $HN(CH_2NHCONH_2)_2$-aldehyde resin.

Example 21

A urea-formaldehyde varnish was prepared in the following manner:

| | Parts by weight |
|---|---|
| Urea | 60 |
| Aqueous formaldehyde (approx. 37.1% CH₂O) | 161 |
| Aqueous NH₃ (28%) | 6 |
| NaOH in 5 parts water | 0.1 | were mixed and heated under reflux for 30 minutes. The resulting syrup was clear and had a solids content of 45%.

To 23 parts of the urea varnish were added 2.0 parts of a 50% solution of $$HCl.HN(CH_2NHCONH_2)_2$$

to form a resin that was self-curing when tested on a hot plate at 140° C. This resin may be used in the preparation of molding compounds and no other added agent is necessary to obtain satisfactory curing.

Example 22

The $HN(CH_2NHCONH_2)_2$—$CH_2O$ resin syrup of Example 19 was incorporated with a melamine in the following proportions:

| | Parts by weight |
|---|---|
| Syrup of Example 19 | 15 |
| Aqueous trimethylol melamine (50% concentration) | 15 |

These materials were heated together under reflux for 15 minutes. The resulting clear resin syrup cured of its own accord when tested on the hot plate at 140° C. although the addition of small amounts of acids, curing reactants, etc. materially accelerate this cure.

Example 23

Self-curing aminoplasts have also been obtained by intercondensing the reaction product of $HN(CH_2NHCONH_2)_2$ and formaldehyde with any one of the following reactants: chloracetamide, glycine, nitrourea, chloral urea, alpha-beta-dibromopropionitrile, chloracetonitrile, trichloracetamide, polysalicylide, citric acid diamide, phenacyl chloride and sulfamic acid. All of the intercondensation products so obtained were self-curing resins. Numerous other intercondensing agents of the above types that can be used successfully will be readily apparent to those skilled in the art.

Example 24

| | Parts by weight |
|---|---|
| $CH_3N(CH_2NHCONH_2)_2$ in 15 parts water | 17.5 |
| Aqueous formaldehyde (approx. 37.1% CH₂O) | 16.2 |

The dicarbamidomethyl monomethyl amine prepared by reacting 2 mols monomethylol urea with one mol monomethyl amine under the previously prescribed conditions was mixed with the formaldehyde and the mixture refluxed for 45 minutes. Concentration of the clear syrupy product produced a clear thermoplastic, water-soluble resin. The addition of various curing agents such as chloracetamide, trichloracetamide, phenacyl chloride, nitrourea, chloral urea, malonic acid monoamide, etc. to the resin caused it to become infusible and water-insoluble at 140° C.

Example 25

| | Parts by weight |
|---|---|
| $CH_3N(CH_2NHCONH_2)_2$ | 3.5 |
| Aqueous formaldehyde (approx. 37.1% CH₂O) | 10 |
| Shellac | 25 | were mixed into a paste and heated at 140° C. The shellac mixture became heat-hardened at this temperature.

In producing any of these new condensation products, the choice of the aldehyde component is dependent largely upon economic considerations and the particular properties desired in the finished product. I prefer to use as the aldehyde reactant, formaldehyde or compounds engendering formaldehyde, e. g. paraformaldehyde, hexamethylene tetramine, etc. For some applications I may use, for instance, acetaldehyde, propionaldehyde, butyraldehyde, acrolein, methacrolein, crotonaldehyde, benzaldehyde, furfural, etc. mixtures thereof, or mixtures of formaldehyde (or compounds engendering formaldehyde) with such aldehydes. Various aldehyde-addition products may be used instead of aldehydes. Such products include the mono- and poly-(N-carbinol) derivatives, more particularly the mono- and polymethylol derivatives, of urea, thiourea, selenourea, and iminourea, substituted ureas, thioureas, selenoureas, and iminoureas, derivatives of amides of poly-carboxylic acids, e. g. maleic, itaconic, fumaric, adipic, malonic, citric, phthalic, etc. I may also use with particularly good results, the methylol melamines, e. g. mono-, di-, tri-, tetra-, penta-, and hexa-methylol melamines. Mixtures of these materials or mixtures of an aldehyde with such materials may also be used.

The ratio of aldehydic reactant to the diureide derivatives may be varied over a wide range but ordinarily is of the order corresponding to at least one mol of the aldehyde, or an equivalent amount of an aldehyde engendering or addition products, for each mol of the diureide derivative. Thus, I may use, for example, from one to five or six mols, preferably 3 mols, of an aldehyde for each mol of the diureide derivative.

Dyes, pigments, plasticizers, mold lubricants, opacifiers, and various fillers (e. g. wood flour, glass fibers, asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used, as has been shown, as modifiers of other natural and synthetic resins, as laminating varnishes in the production of laminated articles wherein sheet materials, e. g. paper, cloth, sheet asbestos, etc. are coated and impregnated with the resin, superimposed and thereafter united under heat and pressure. They may also be used as modifiers of, or may be modified by, the synthetic compositions disclosed in various copending applications of mine, for example in copending applications Serial Nos. 409,017; 409,018; 409,019; 409,020; 409,022, filed concurrently herewith and assigned to the same assignee as the present invention. More specifically, the compositions of this invention may be used in the form of mixtures with condensation products of preformed substituted or unsubstituted mono-, or tri-(carbamidomethyl) amines and aldehydes, or condensation products of substituted or unsubstituted mono, di-, or tri-(monocarbinolureidomethyl) amines, or with two or more of such condensation products. They may be used in the production of wire or baking enamels, for bonding or cementing together mica flakes to form a laminated mica article, for bonding together abrasive grains in the production of resin-bonded abrasive articles, such for instance as grindstones, sandpapers, etc. in the manufacture of electrical resistors, etc. They also may be employed for treating cotton, linen, and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising an aldehyde and an organic compound corresponding to the formula

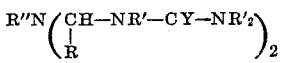

where Y is a member of the class consisting of oxygen and sulphur, R is a member of the class consisting of hydrogen and monovalent hydrocarbon radicals of not more than six carbon atoms, at least one R' is hydrogen and the others are members of the class consisting of hydrogen and monovalent hydrocarbon and halogeno-hydrocarbon radicals and R'' is a monovalent hydrocarbon radical.

2. A composition comprising a condensation product of ingredients comprising an aldehyde and an amine corresponding to the general formula

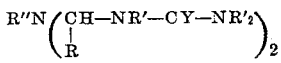

where Y represents oxygen and R, R' represent hydrogen and R'' a monovalent hydrocarbon radical.

3. A composition comprising a condensation product of ingredients comprising formaldehyde and an amine corresponding to the general formula

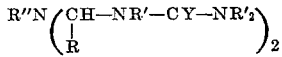

where Y represents oxygen and R, R' represent hydrogen and R'' a monovalent hydrocarbon radical.

4. A composition as in claim 1 wherein the reaction product is an alcohol-modified product of the stated components.

5. A composition comprising the product of reaction of ingredients comprising urea, a di-monocarbamidomethyl amine having the formula

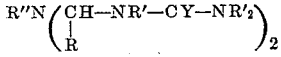

where Y is a member of the class consisting of oxygen and sulphur, R is a member of the class consisting of hydrogen and monovalent hydrocarbon radicals of not more than six carbon atoms, at least one R' is hydrogen and the others are members of the class consisting of hydrogen and monovalent hydrocarbon and halogeno-hydrocarbon radicals and R'' is a monovalent hydrocarbon radical, and an aldehyde.

6. A composition comprising the product of reaction of melamine, a di-monocarbamidomethyl amine having the formula

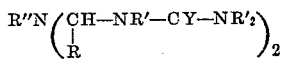

where Y is a member of the class consisting of oxygen and sulphur, R is a member of the class consisting of hydrogen and monovalent hydrocarbon radicals of not more than six carbon atoms, at least one R' is hydrogen and the others are members of the class consisting of hydrogen and monovalent hydrocarbon and halogeno-hydrocarbon radicals and R'' is a monovalent hydrocarbon radical and formaldehyde.

7. A heat-curable composition comprising the heat-convertible product of reaction of (1) a partial condensation product of ingredients comprising urea, an aldehyde and an amine derivative of the general formula

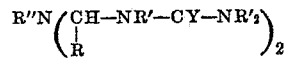

where Y is a member of the class consisting of oxygen and sulphur, R is a member of the class consisting of hydrogen and a monovalent hydrocarbon radical of not more than six carbon atoms, and at least one R' is hydrogen and the others are members of the class consisting of hydrogen and monovalent hydrocarbon and halogeno-hydrocarbon radicals, and R'' is a monovalent hydrocarbon radical, and (2) a chlorinated acetamide.

8. A product comprising the heat-cured composition of claim 7.

9. A composition comprising the product of reaction of formaldehyde, polyvinyl alcohol, and an amine derivative corresponding to the formula

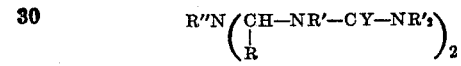

where Y is a member of the class consisting of oxygen and sulphur, R is a member of the class consisting of hydrogen and a monovalent hydrocarbon radical of not more than six carbon atoms, and at least one R' is hydrogen and the others are members of the class consisting of hydrogen and monovalent hydrocarbon and halogeno-hydrocarbon radicals and R'' is a monovalent hydrocarbon radical.

10. A resinous composition comprising the product of reaction of ingredients comprising furfural and an amine derivative corresponding to the formula

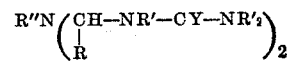

where Y is a member of the class consisting of oxygen and sulphur, R is a member of the class consisting of hydrogen and a monovalent hydrocarbon radical of not more than six carbon atoms, and at least one R' is hydrogen and the others are members of the class consisting of hydrogen and monovalent hydrocarbon and halogeno-hydrocarbon radicals and R'' is a monovalent hydrocarbon radical.

11. The method of preparing new condensation products which comprises effecting reaction between ingredients comprising an aldehyde and an amide corresponding to the formula

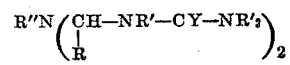

where Y is a member of the class consisting of oxygen and sulphur, R is a member of the class consisting of hydrogen and a monovalent hydrocarbon radical of not more than six carbon atoms, and at least one R' is hydrogen and the others are members of the class consisting of hydrogen and monovalent hydrocarbon and halogeno-hydrocarbon radicals and R'' is a monovalent hydrocarbon radical.

12. A resinous composition comprising the product of reaction of melamine and an aldehyde and a di-(monocarbamidomethyl) amine having the general formula

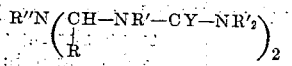

where Y is a member of the class consisting of oxygen and sulphur, R is a member of the class consisting of hydrogen and monovalent hydrocarbon radicals of not more than six carbon atoms, at least one R' is hydrogen and the others are members of the class consisting of hydrogen and monovalent hydrocarbon and halogeno-hydrocarbon radicals and R'' is a monovalent hydrocarbon radical.

GAETANO F. D'ALELIO.